July 4, 1933.   C. L. EICH   1,916,193
PISTON LATHE
Filed May 26, 1931
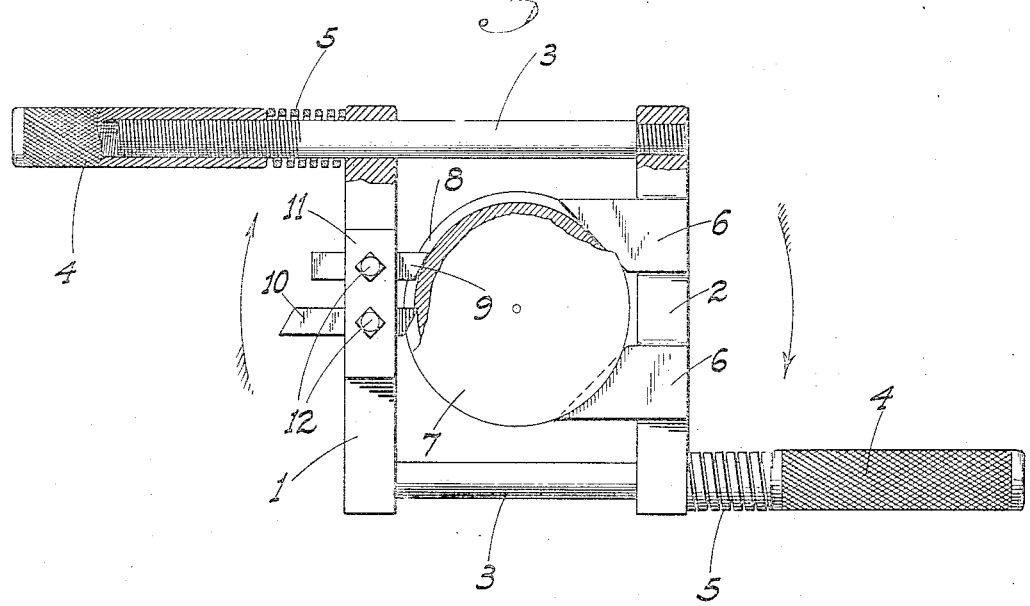
Fig. 1
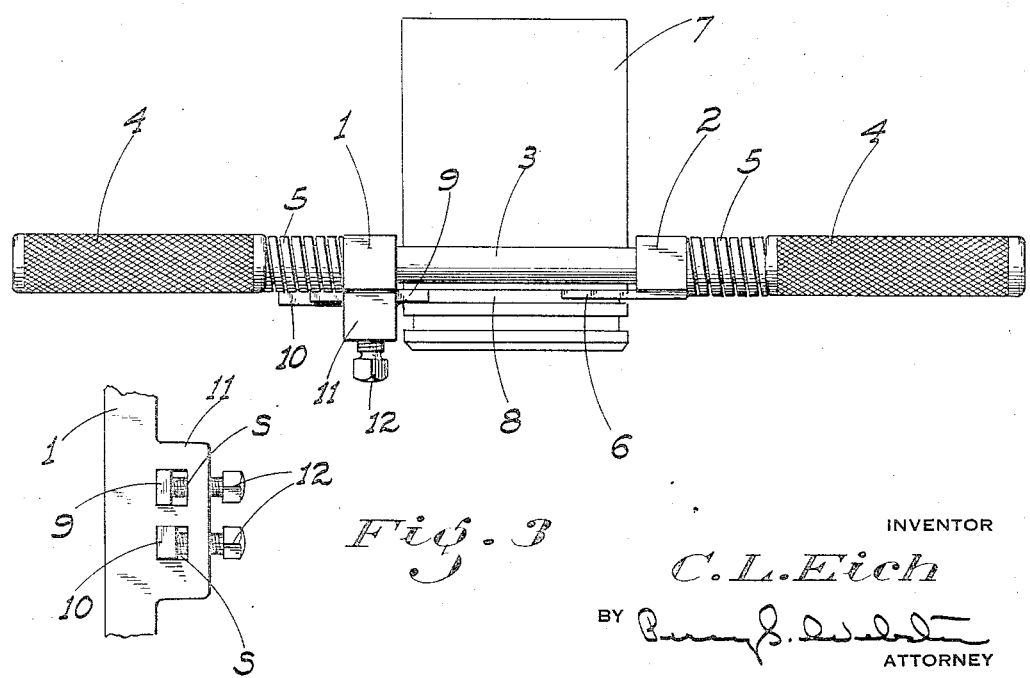
Fig. 2
Fig. 3
INVENTOR
C. L. Eich
BY
ATTORNEY Patented July 4, 1933

1,916,193

UNITED STATES PATENT OFFICE

CHARLES L. EICH, OF FRESNO, CALIFORNIA

PISTON LATHE

Application filed May 26, 1931. Serial No. 540,044.

This invention relates to hand tools, my principal object being to provide a tool in the form of a portable hand-operated lathe by means of which the lands of ring grooves in gas engine pistons may be cut back, the grooves may be widened or deepened as may be desired, or the piston undercut to allow for drilling below the oil ring; it being understood that all operations are carried out separately and with the use of the proper tool element for the purpose mounted in the lathe.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is an end view of my improved lathe, partly in section and operating on a piston to deepen a ring groove of the same.

Fig. 2 is a top plan view of the tool as in operation.

Fig. 3 is a fragmentary end view of one of the bars showing the support for the cutter and the cooperating depth gage and guide member.

Referring now more particularly to the characters of reference on the drawing, the lathe comprises a pair of parallel bars 1 and 2. To the lower end of the bar 1, and the upper end of the bar 2, the ends of rods 3 of the same size and length are rigidly secured. The rods are parallel to each other and extend in opposite directions so as to slidably pass through the lower and upper ends of the bars 2 and 1, respectively. Outward of the bars the rods are both threaded and are engaged by handle sleeves 4 of the same size and length, with stiff compression springs 5 between the handles and the adjacent bars.

Secured on one side of the bar 2 centrally between the rods are thin plates 6 which project in the direction of the bar 1 and whose outer edges are cut so as to be disposed in V shaped relation to each other. These plates form centralizing and locating guides for the piston 7 to be worked on, and engage a ring groove 8 of the piston.

On the same side of the bar 1 as that on which the guide plates 6 of the bar 2 are fixed, are vertically spaced guide and cutting elements 9 and 10, respectively. These are made of tool steel of rectangular or square section as usual, and are ground on one end so as to properly fit the groove being worked on and function for the particular operation to be performed.

The elements 9 and 10 extend parallel to the rods 3, and the element 10 is disposed so that its cutting edge is in line with the line bisecting the angle between the outer edges of the guides 6. Said cutting edge will therefore engage the groove at a point centrally between the points of engagement of the guides 6 therewith. The guide element 9 is above the cutting element relative to the direction of rotation of the tool, and is ground on its outer end so as to smoothly engage the bottom of the groove and also so that it is the exact width of the groove. The elements 9 and 10 abut against the side of the bar 1 and are mounted in slots S formed in a block 11 rigidly secured against said bar. Set screws 12 in the block bear against the elements and adjustably hold them in position.

In operation the piston is clamped in a vise or chuck, and the handles are first unscrewed so that the bars are spread sufficiently to enable them to straddle the piston. The cutting element 10 is set so as to have a certain advance relative to the guide 9, and the handles are then screwed up simultaneously to bring the bars together, and so that the guides 6, and the elements 9 and 10, all engage the ring groove. The cutting element 10 is held against the metal with a pressure sufficient to enable it to cut by a screwing up pressure exerted on the handles, which places a yieldable pressure on the bars by reason of the springs 5 interposed therebetween. The handles are then grasped and pressure exerted thereon in a direction to rotate the lathe about the piston for a full turn. If another cut is then necessary, the handles are again screwed up to restore the pressure on the spring and force the cutter deeper into the groove, and the tool is again rotated about the piston.

It will be noted that the member 9 serves as a depth gage for the cut as well as being a guide. Also, the cutter and guide are readily removed, so as to be interchangeable with others to fit various sizes of grooves.

It will also be noted that the bars, the rods, the springs and the handle sleeves are all purposely made the same size, so that manufacturing and assembling operations are simplified and cost held at a low figure.

From the foregoing description it will be readily seen that I have produced such a device as substantially fulfills the objects of the invention a set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hand lathe for cylindrical members comprising a pair of bars adapted to be disposed on opposite sides of a member for movement toward and from each other, parallel rods secured to the upper end of one bar and to the lower end of the other bar and slidably projecting thence in opposite directions through and beyond the corresponding opposite bars, a cutter on one bar for engagement with the member, and handle sleeves adjustably threaded on the rods beyond the bars whereby the latter may be rotated as a unit and adjusted toward and from each other.

2. A hand lathe for cylindrical members comprising a pair of bars adapted to be disposed on opposite sides of a member for movement toward and from each other, parallel rods secured to the upper end of one bar and to the lower end of the other bar and slidably projecting thence in opposite directions through and beyond the corresponding opposite bars, a cutter on one bar for engagement with the member and disposed substantially parallel to the rods, handle sleeves adjustably threaded on the rods beyond the bars, and compression springs on the rods between the inner ends of the sleeves and the adjacent bars.

In testimony whereof I affix my signature.

CHARLES L. EICH.